(12) United States Patent
Magherini et al.

(10) Patent No.: US 11,047,452 B2
(45) Date of Patent: Jun. 29, 2021

(54) TRANSMISSION GEARBOX FOR A MOTOR VEHICLE AND SADDLED VEHICLE COMPRISING SUCH A TRANSMISSION GEARBOX

(71) Applicant: PIAGGIO & C. S.P.A., Pontedera (IT)

(72) Inventors: Adriano Magherini, Pontedera (IT); Mario Sestini, Pontedera (IT)

(73) Assignee: PIAGGIO & C. S.P.A., Pontedera (IT)

( * ) Notice: Subject to any disclaimer, the term of this patent is extended or adjusted under 35 U.S.C. 154(b) by 0 days.

(21) Appl. No.: 16/496,150

(22) PCT Filed: Mar. 22, 2018

(86) PCT No.: PCT/IB2018/051926
§ 371 (c)(1),
(2) Date: Sep. 20, 2019

(87) PCT Pub. No.: WO2018/172969
PCT Pub. Date: Sep. 27, 2018

(65) Prior Publication Data
US 2020/0032878 A1    Jan. 30, 2020

(30) Foreign Application Priority Data

Mar. 22, 2017   (IT) .................. 102017000031648

(51) Int. Cl.
*F16H 59/00*       (2006.01)
*F16H 61/00*       (2006.01)
(Continued)

(52) U.S. Cl.
CPC ............... *F16H 3/24* (2013.01); *F16H 57/12* (2013.01); *F16H 2306/40* (2013.01)

(58) Field of Classification Search
CPC .. F16H 2063/3093; F16H 63/30; F16F 11/10; F16D 11/14; F16D 2011/008
See application file for complete search history.

(56) References Cited

U.S. PATENT DOCUMENTS 796,205 A  *  8/1905  Graham etal. .......... F16D 11/14
                                                192/69.62
6,354,417 B1    3/2002  Narita et al.
(Continued)

FOREIGN PATENT DOCUMENTS

JP        H10 61731 A       3/1998

*Primary Examiner* — Jake Cook
(74) *Attorney, Agent, or Firm* — McGlew and Tuttle, P.C.

(57) ABSTRACT

A transmission gearbox, in particular of a motor vehicle, is described including: a primary shaft receiving a driving torque via a primary transmission; a secondary shaft connected to the primary shaft. On the secondary shaft: an idle wheel revolvingly non-working on the secondary shaft including at least a coupling slot, and at least a coupling wheel revolvingly integral to the secondary shaft including a corresponding coupling tooth are assembled, respectively. The coupling wheel is arranged adjacent to the idle wheel and it can be axially moved so as to translate axially between a free configuration, where it is disengaged with respect to the idle wheel, and an engaged configuration, where it is engaged with the idle wheel by implementing a front coupling between the coupling tooth and the coupling slot for transmitting the motion between the primary shaft and the secondary shaft.

16 Claims, 13 Drawing Sheets

(51) Int. Cl.
*F16H 63/00* (2006.01)
*F16H 3/24* (2006.01)
*F16H 57/12* (2006.01)

(56) References Cited

U.S. PATENT DOCUMENTS

| | | | |
|---|---|---|---|
| 2011/0198188 A1* | 8/2011 | Kuwashima | F16H 55/17 192/108 |
| 2012/0192665 A1* | 8/2012 | Gumpesberger | F16D 11/14 74/325 |
| 2012/0240701 A1* | 9/2012 | Matsuda | F16D 11/14 74/333 |
| 2014/0148286 A1 | 5/2014 | Murray et al. | |

\* cited by examiner

TRANSMISSION GEARBOX FOR A MOTOR VEHICLE AND SADDLED VEHICLE COMPRISING SUCH A TRANSMISSION GEARBOX

CROSS REFERENCE TO RELATED APPLICATIONS

This application is a United States National Phase Application of International Application PCT/IB2018/051926 filed Mar. 22, 2018, and claims the benefit of priority under 35 U.S.C. § 119 of Italian Application 102017000031648, filed Mar. 22, 2017, the entire contents of which are incorporated herein by reference.

TECHNICAL FIELD

The present invention relates to a transmission gearbox, in particular of a motor vehicle.

Moreover, the present invention relates to a transmission wheel operatively assembled in the above-mentioned transmission gearbox.

Additionally, the present invention relates to a motor vehicle equipped with the above-mentioned transmission gearbox, in particular a motorbike, a scooter or a motorcycle, generally a two- or more-wheeled motorcycle, that is a vehicle of saddled type, or of the type thereon it is possible to get, with two or more wheels.

TECHNICAL BACKGROUND

As it is known, a transmission gearbox in a motor vehicle allows to vary the transmission ratio by engaging different speeds, constituted by respective gears. Generally, it has the function of modifying the feature of the torque available to the wheel, allowing to select each time a different transmission ratio.

Commonly, a transmission gearbox comprises: a primary shaft apt to receive a driving torque from a driving axle through a clutch and a pair of toothed wheels, called primary transmission; and a secondary shaft apt to transmit the motion to a final transmission and then to the wheel, in case of a motor vehicle. On the primary shaft first toothed wheels are provided, operatively coupled to second toothed wheels assembled on the secondary shaft. Among the second toothed wheels some idle thereof are provided on the secondary shaft, but dragged into rotation by the first toothed wheels of the primary shaft, and other ones integral in rotation to the secondary shaft but which can be axially moved therealong and able to couple with the idle toothed wheels. These two types of idle and axially movable toothed wheels are always arranged frontally one with respect to the other one, and therefore they are called front coupling gears.

The sliding of the mobile toothed wheels takes place by means of suitable forks which are translated axially by a selecting element; the latter, in turn, can be actuated through a ratchet device by the gearbox lever. The function of the front couplings is that of making integral a determined pair of toothed wheels to the respective primary and secondary shafts.

Constructively, a pair of front coupling toothed wheels comprises an idle wheel, equipped with a plurality of front coupling teeth spaced apart angularly therebetween, and a coupling wheel, wherein coupling slots are obtained, respectively for each coupling tooth, but it is meant that the position of the slots and of the teeth can be reversed, a solution which has to be meant equivalent to the one described above.

The arrangement of the wheels is so that each idle wheel is arranged adjacent and frontally to a coupling wheel. If there are no synchronization devices, the successful coupling manoeuver depends upon the probability that, in a precise moment, the teeth of the idle wheel are facing exactly at a slot of the coupling wheel.

They are toothed wheels which provide coupling slots with slightly larger dimensional extension than the coupling tooth. However, this technical solution determines a not necessarily immediate shift engagement, since, in the relative rotation of the two wheels, the tooth can meet difficulties in intercepting the coupling slot as soon as the two wheels are placed side by side, by making the driver to meet difficulties in shifting gears.

In order to increase such probability, the angular width of the slots has been increased, by making its angular extension considerably higher than the width of the coupling tooth. In this way, the action of shifting gears by the driver is more immediate, since the tooth will be able to intercept and engage in the increased slot more quickly.

If on one side such solution improves the gearbox operation, the increased size of the coupling slot involves some drawbacks.

In particular, the backlash between coupling tooth and coupling slot, even called "backlash", is considerable and involves a free stroke of the tooth inside the slot. Under "free" it is meant that the tooth moves in the slot by moving between a pushing wall—engaged for transmitting the accelerating motion—and a releasing wall, opposite to the pushing wall—engaged in the decelerating phase. The distance between the pushing wall and the releasing wall defines the tooth stroke.

Under particular driving conditions, with engaged gear and low speed, upon a clutch/accelerator action by the driver, the tooth is liable to move between the pushing wall and the releasing wall of the slot. This motion makes that the tooth hits onto the walls, by causing an unwished noise of the gearbox during driving. In other words, the frequent use of accelerator and clutch, typically in the city traffic, makes that the two primary and secondary shafts are subjected to sudden accelerations and decelerations and, then, the teeth and the slots of the respective toothed wheels, integral thereto, are subjected to repeated hits determining a very unpleasant acoustic comfort: each tooth bounces between the pushing wall and the releasing wall, and vice versa.

The same gearbox noise drawback appears upon engaging gears and generally in shifting gears.

An additional particular case is obtained when the first gear is engaged from the neutral position of the gearbox when the vehicle is still. Commonly, when the clutch is engaged, the non-working idle wheel is not wholly still, but it rotates at a certain angular speed which determines a speed difference with the coupling wheel integral to the secondary shaft which on the contrary is still when the vehicle is still.

In the engaging dynamics, each tooth of the coupling wheel then can be in an intermediate position of a respective slot. Therefore, before arriving in contact with the pushing wall it performs—even in this case—a free stroke. Assuming that the tooth engages in the slot in a center position, in order to implement the transmission, the tooth has still to travel half of the angular sector of the slot bringing it in contact with the pushing wall of the same. Due to the difference in angular speed then an impulsive hit takes place between the tooth wall and the inner wall of the slot, which aspect produces a hit known as "hammer blow" upon engaging the first gear.

In the same way and substantially for the same above-described dynamics, noisy engagements are performed generally upon shifting gears.

Therefore, the need is felt for solving the drawbacks and the limitations mentioned with reference to the known art.

SUMMARY

The object of the present invention is then to provide a transmission gearbox of a motor vehicle allowing to reduce the noisiness phenomena during driving, and generally upon shifting gears.

An additional object of the present invention is to provide a motor vehicle, in particular a motorcycle, a scooter or a motorbike having two or more wheels, equipped with said transmission gearbox reaching the same objects.

Another object of the present invention is to provide a transmission gearbox wheel reaching the same objects.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1A' is a corresponding schematic view of the gearbox gears in said first configuration;

FIG. 1B' is a corresponding schematic view of the gearbox gears in said second configuration;

DESCRIPTION OF PREFERRED EMBODIMENTS

Figure 1:
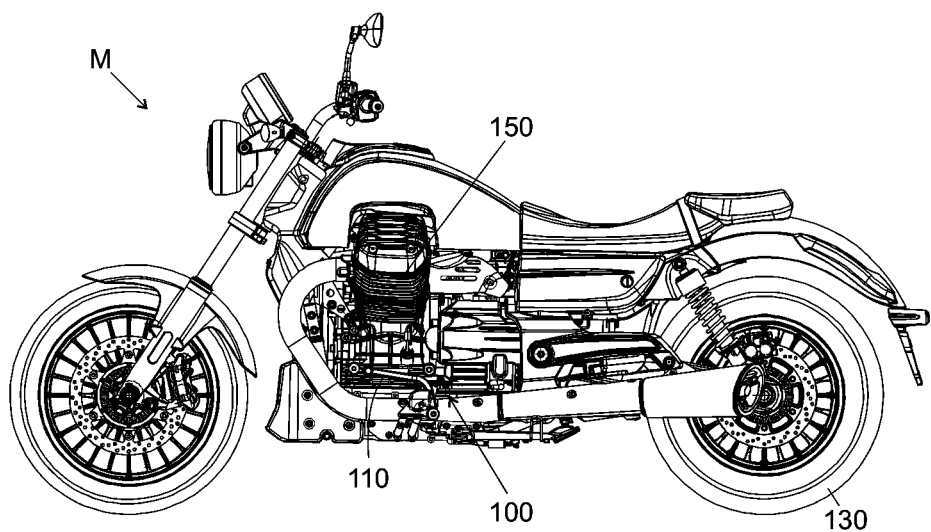
FIG. 1 is a side view of a motor vehicle, in particular a two-wheeled vehicle, that is a two-wheeled motorcycle, wherein a transmission gearbox according to the present invention is arranged.

Referring to the drawings, the elements or element portions in common between the embodiments described hereinafter will be designated with same reference numbers.

By referring to the above-mentioned figures, M designates globally an overall view of a motorcycle, then a saddled vehicle, or vehicle which can be got on, which in the present case has two wheels, a front and a rear one, but which can have even more than two wheels, for example two tilting front wheels and/or in case two rear wheels, which will be designated hereinafter with the more general and simple term of motor vehicle.

The motor vehicle M comprises a transmission gearbox 100, according to the present invention, allowing to perform the gear engagement by means of a gearbox lever 110.

It is specified that the transmission gearbox 100 can be functionally applied to other devices or vehicles which require to vary a transmission ratio, by using front engagement wheels as described in detail hereinafter.

Figure 1A:
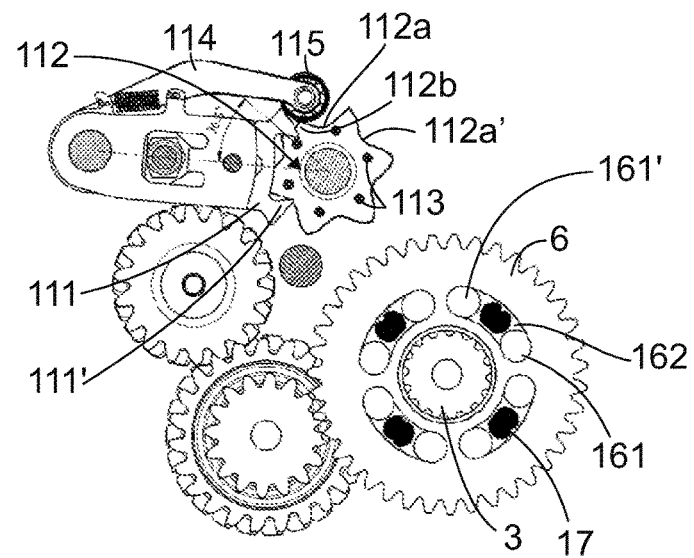
FIG. 1A is a schematic view of the mechanism for actuating the gearbox, in a first configuration.
Figure 1A:
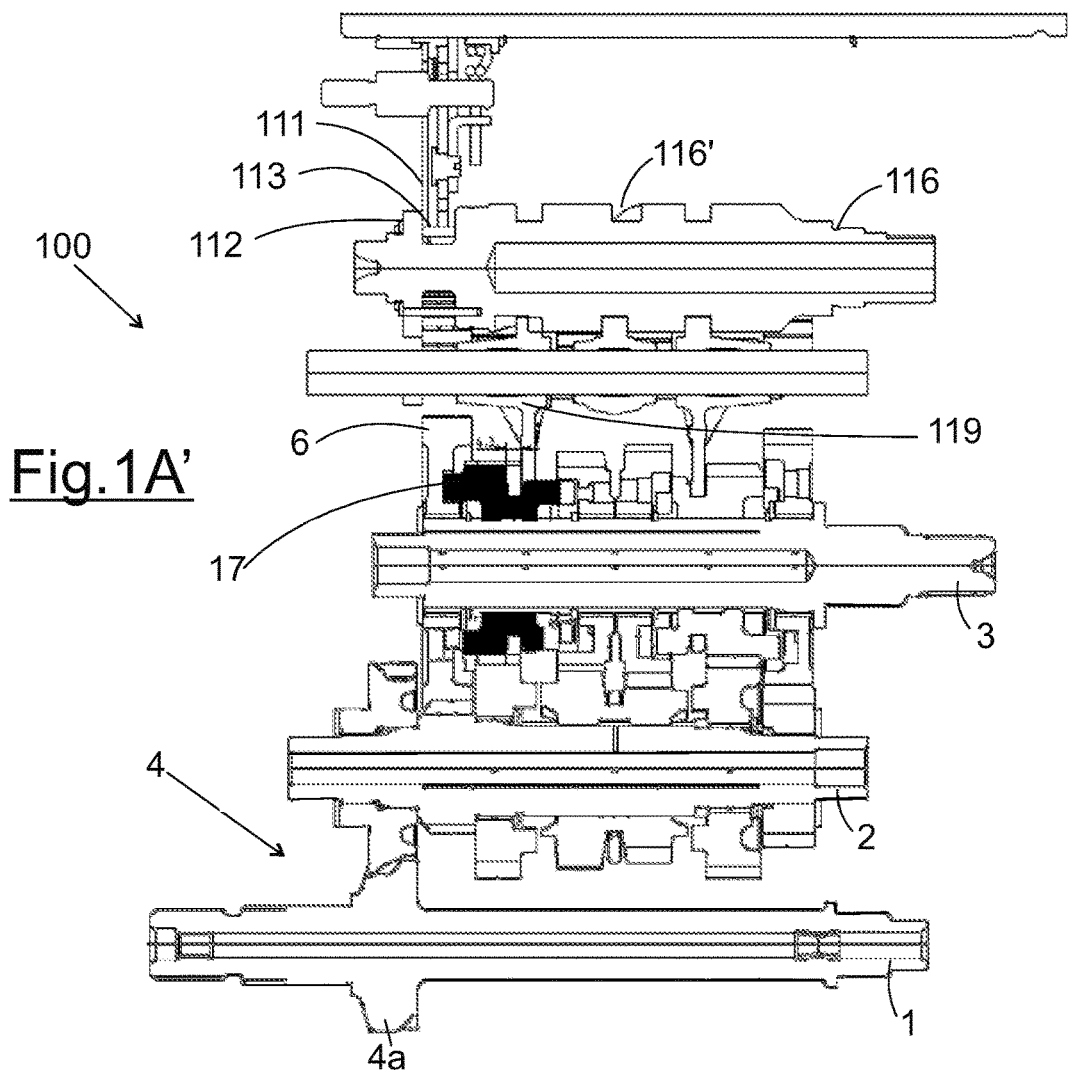
Figure 1B:
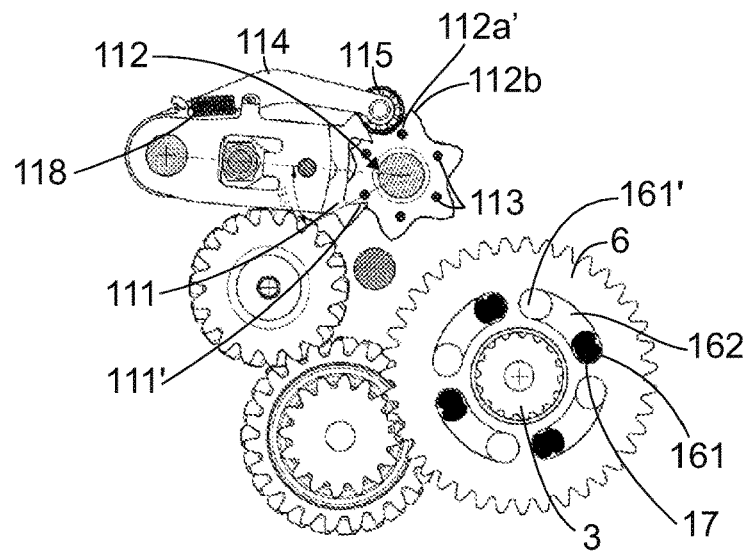
FIG. 1B is a schematic view of the mechanism for actuating the gearbox, in a second configuration.
Figure 1B:
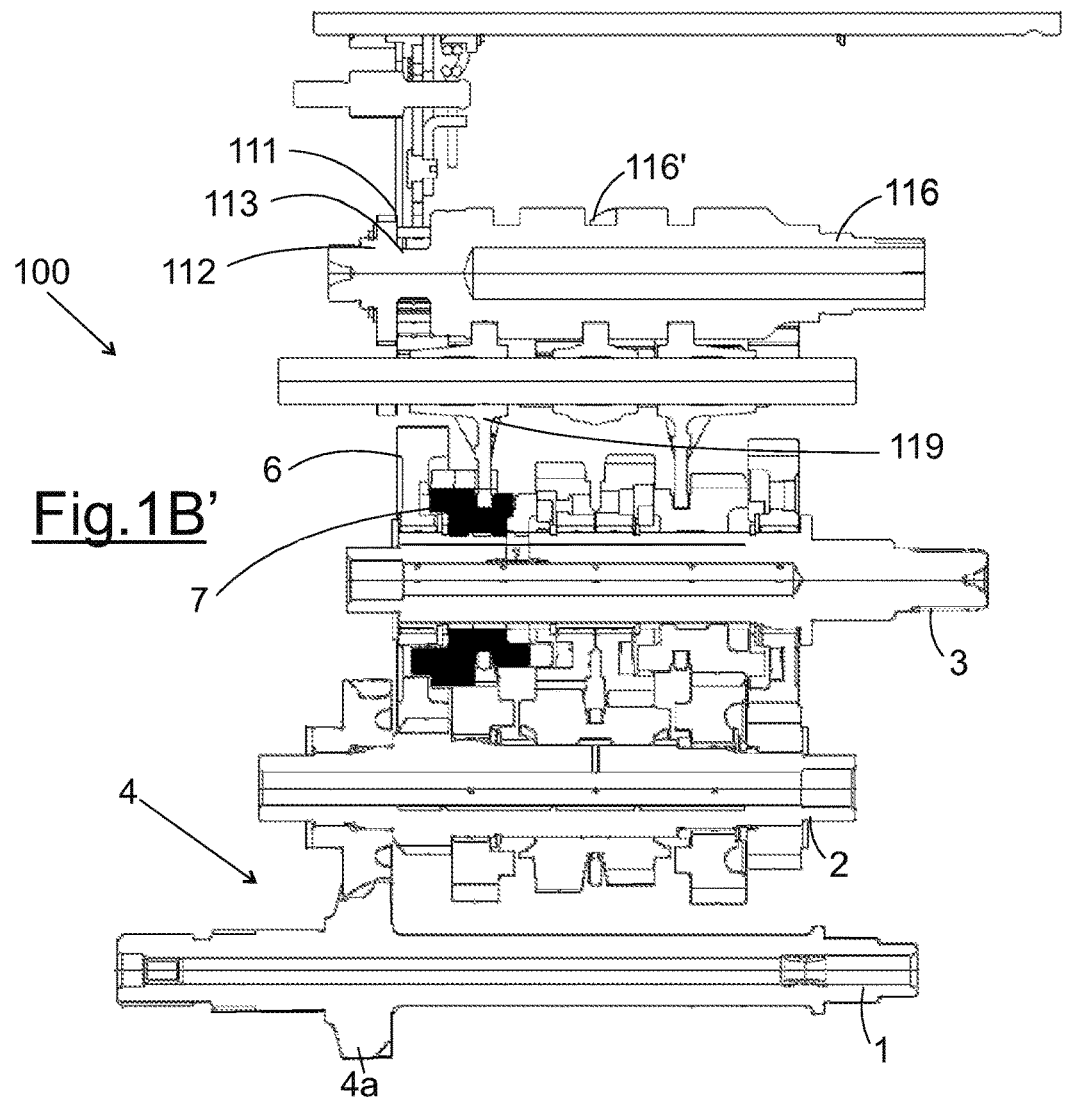

By referring to FIGS. 1A and 1B, the transmission gearbox 100 comprises the gearbox lever 110 controlling a ratchet 111 according to a known actuation mechanism. The ratchet 111 acts on a selecting element 112 or cam having a star-like shape. The selecting element 112 comprises a plurality of valleys 112a, 112a' and ridges 112b. The number of valleys 112a, 112a' defines the number of gearbox gears, as better described hereinafter. A stabilizer 114,115 is associated to the selecting element 112 and it acts thereon to keep the gear in position.

Figure 2:
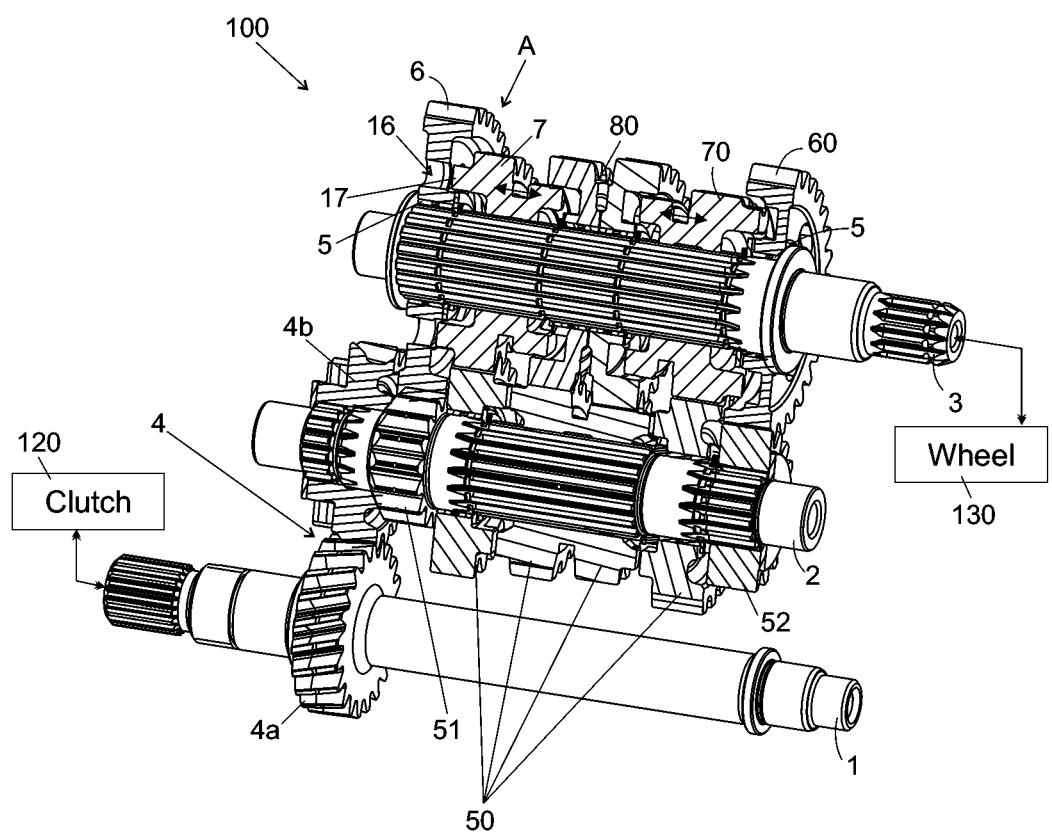
FIG. 2 is a perspective view of a transmission gearbox, with some elements represented schematically, in a first configuration.
Figure 2A:
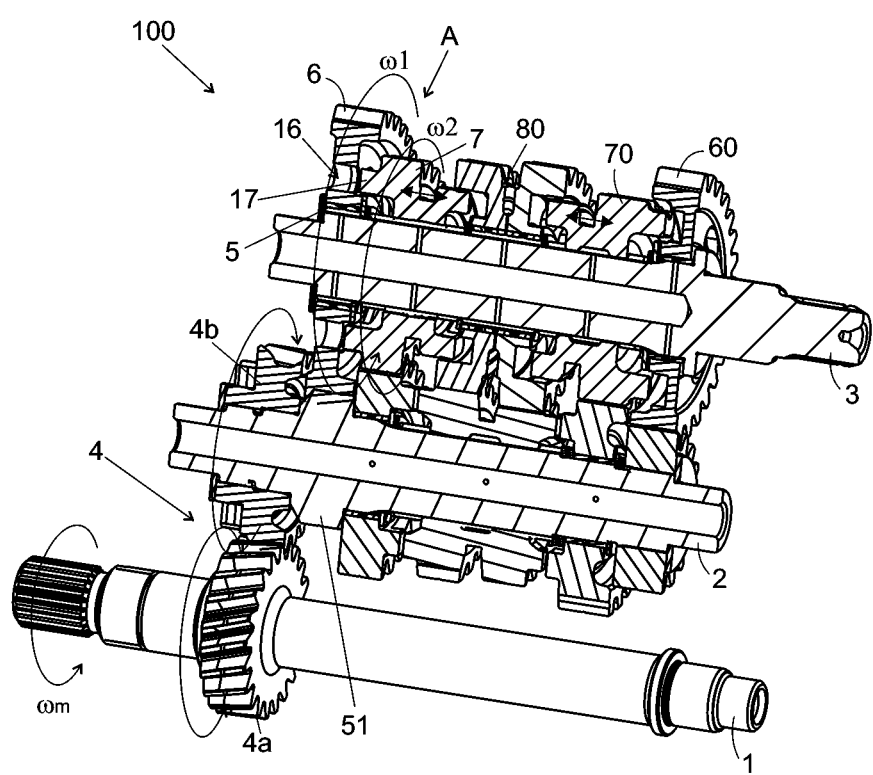
FIG. 2A is a cross sectional view of FIG. 2.

As better shown in FIG. 2, the gearbox further comprises a primary shaft 2 apt to receive a driving torque M (FIG. 2A) produced by actuation means, for example a motor 150 of the motor vehicle M. The torque is transmitted by a clutch coupling 120 and a pair of toothed wheels 4a and 4b, the first one thereof is obtained as one piece on a clutch shaft, that is a countershaft coaxial to the friction (which will be designated as "clutch shaft").

The pair of toothed wheels 4a and 4b constitutes the one which commonly is designated as "primary transmission".

A secondary shaft 3 is mechanically dragged by the primary shaft 2. The primary shaft 2 comprises first toothed wheels 51, 50, 52 apt to couple with second toothed wheels 6, 7, 80, 70, 60 assembled on the secondary shaft 2. The secondary shaft 3 is connected to a final transmission, for example a cardan transmission, comprising a cardan shaft—bevel gear system.

The second wheels include at least an idle wheel 6, 60, 80 revolvingly non-working for example on bearings 5, able to rotate freely around the axis of the secondary shaft 3. The idle wheel 6, 60, 80 comprises at least a coupling slot 16, in particular several coupling slots 17.

A coupling wheel 7, 70 is further provided, revolvingly integral to the secondary shaft 3, for example by means of a grooved coupling, comprising at least a corresponding coupling tooth 17. In particular, several coupling teeth 17 are provided apt to engage each one in a respective coupling slot 16.

Hereinafter in order to explain the gearbox operation one single pair of wheels 6 and 7 will be referred to, wherein the coupling wheel 7 is arranged adjacent to the idle wheel 6 with the coupling teeth 17 faced towards the coupling slots 16. Functionally, the coupling wheel 7 can be axially moved on the secondary shaft 3 and apt to translate onto the secondary shaft 3, for example by means of an actuating fork 119 (FIGS. 1A' and 1B') in turn controlled by the desmodromic drum 116 in conventional way.

Figure 3:
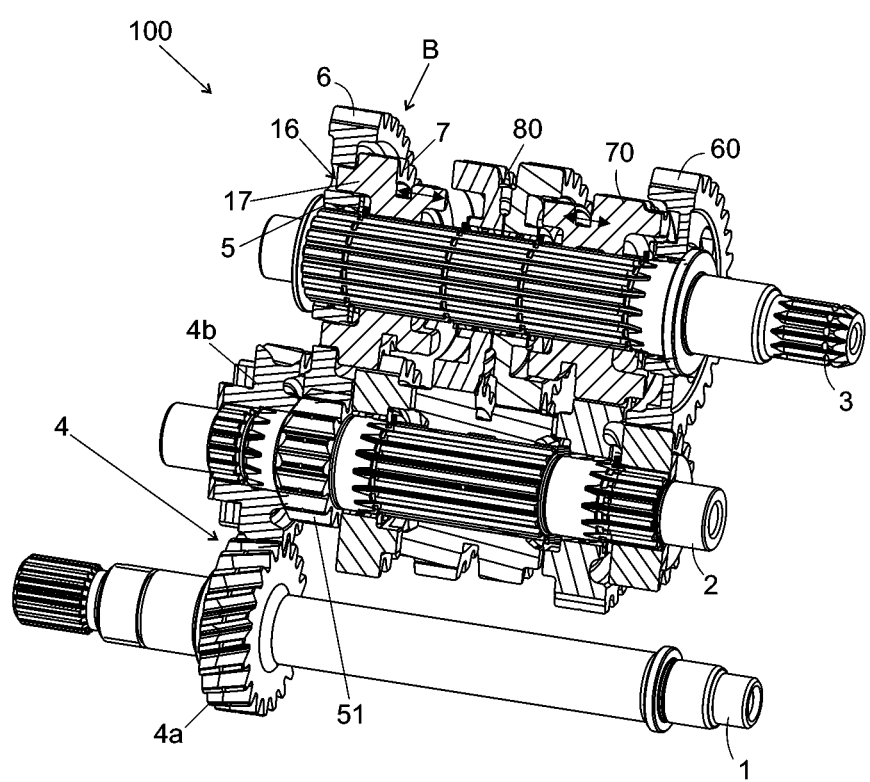
FIG. 3 is a perspective view of a transmission gearbox in a second configuration.

The coupling wheel 7, in this way, can move on the secondary shaft 3 between a free configuration A (FIGS. 2 and 2A), wherein it is disengaged with respect to the idle wheel 6, and an engaged configuration B (FIGS. 3 and 3A), wherein it is engaged with the idle wheel 6 by implementing a front coupling between the coupling teeth 17 and the coupling slots 16. In this way, the occurred coupling allows to transmit the motion between the primary shaft 2 and the secondary shaft 3. In particular, the front coupling allows to transfer the motion from the idle wheel 6 to the coupling wheel 7 revolvingly integral to the secondary shaft 3.

Figure 4:
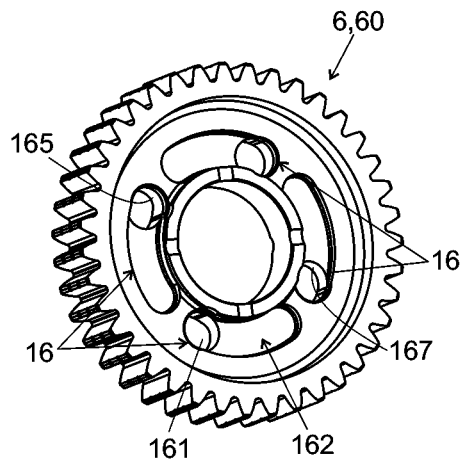
FIG. 4 is a perspective view of an idle wheel of the transmission gearbox of FIG. 2.

As it is better shown in FIG. 4, the coupling slot 16 comprises a portion of shallow recess 162 extending for at least an angular sector Lc with respect to the overall angular sector La of the coupling slot 16. The portion of shallow recess 162 then defines at least a first through-portion 161 and the second closed portion 162 of the coupling slot 16.

The closed portion 162 allows to intercept and guide the engagement of the coupling tooth 17 towards at least the first through-portion 161 implementing the coupling with the coupling tooth 17, by reducing noisiness both in the engagement phase and during the vehicle travel.

In particular, the first through-portion 161 has an angular size slot Lp defined as angular sector. The coupling tooth 17 has a longitudinal size tooth Ld (FIG. 5), reduced with respect to the angular size of the slot Lp, so as to form a coupling with backlash with the coupling tooth 17. The obtained coupling has a tolerance comprised between 0.1 mm and 1.5 mm, in particular between 0.3 mm and 0.6 mm.

In other words, the coupling tooth 17 has reduced sizes with respect to the first through-portion 161 of the coupling slot 16. In this way, since the angular size Lp of the slot fraction with complete depth 161 is slightly larger than the width Ld of the coupling tooth 17, the backslash is almost null, and the acoustic comfort is considerably better.

Preferably, the portion of shallow recess extends for an angular sector of about ⅔ of the coupling slot 16. In particular, the coupling tooth 17 moves in the coupling slot 16 only by few millimeters. Therefore, once the gear is engaged when it shifts between the pushing wall 165 (FIG. 4), engaged for transmitting the accelerating motion, and the releasing wall 167 (FIG. 4), engaged when a decelerating phase is performed, the shifting which it performs is considerably reduced and then, the noise produced when the tooth is in contact against the walls 165, 167 results to be reduced.

Figure 4A:
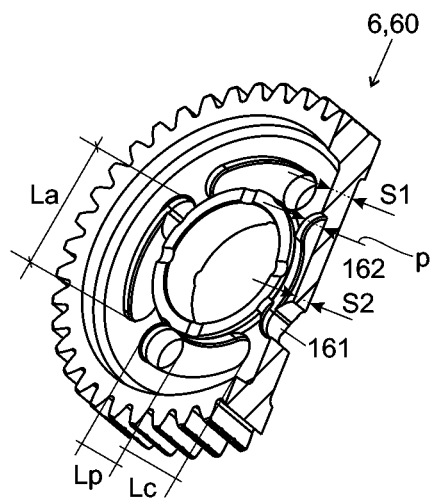
FIG. 4A is a partially sectioned view of FIG. 4.

The coupling slot 16 is then shaped with double depth. The first through-portion 161 has a thickness $S_1$ and the second portion of shallow recess 162 has a thickness $S_2$ smaller than $S_1$ (FIG. 4A).

More in particular, the portion of shallow recess 162 has a depth p, defined as difference between the thickness $S_1$ and the thickness $S_2$ (FIG. 4A), so that when the coupling tooth 17 rests upon the shallow recess 162, the selecting element 112 performs a partial rotation Qp, corresponding to the axial stroke Ta1 (as described hereinafter in details) performed by the tooth 17 as far as it touches the shallow recess 162. Said partial rotation Qp has to be so as to guarantee that the driver can reserve surely the gear he/she wants to engage. In other words, it has to guarantee that the gear disengagement does not occur.

Figure 1C:
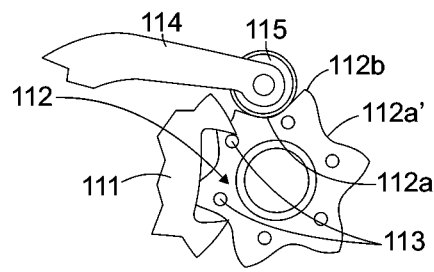
FIG. 1C is a schematic view of the motion of the system for actuating the gearbox of FIGS. 1A and 1B.
Figure 1D:
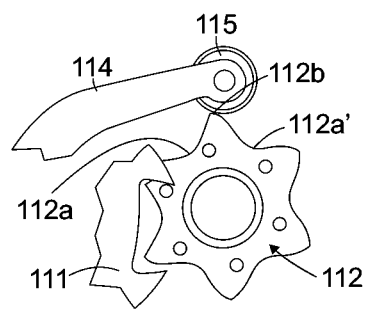
FIG. 1D is a schematic view of the motion of the system for actuating the gearbox of FIGS. 1A and 1B.

This effect translates into a particular geometry of the shallow recess 162 so that when said coupling tooth 17 rests upon the shallow recess 162, the selecting element 112 performs the partial rotation Qp which results to be sufficient to move the stabilizer 114,115, and in particular the heading bearing 115, between a first position wherein it lies at a first valley 112a of the selecting element 112 FIG. 1C, and a second position wherein the stabilizer, in particular the bearing 115, climbs over the ridge 112b adjacent to the first valley 112a (FIG. 1D).

Figure 1E:
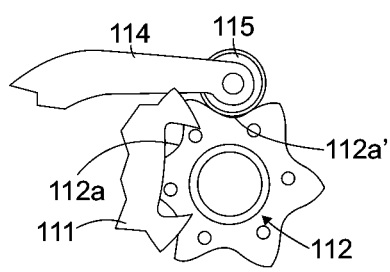
FIG. 1E is a schematic view of the motion of the system for actuating the gearbox of FIGS. 1A and 1B.

When the coupling tooth 17 engages with the through-portion 161, 161', that is the front coupling is completed, the bearing 115 of the stabilizer lies in a second valley 112a' adjacent to the first valley 112a (FIG. 1E).

In other words, in the typical actuating motion, the ratchet 111 hooks up the pins 113 integral to the selecting element 112 to make the latter to rotate, by making the bearing 115 to climb over an angular sector of the same selector. This sequence produces the gear shifting.

Under reinforcement of the ratchet 111 a position is meant so that the latter can act on pins 113 to produce the rotation of the selecting element 112. In other words, it is meant that the ratchet 111 is reinforced, when a pair of pins 113 adjacent therebetween is encompassed in the inner space of the same, that is the space defined by the "U"-like shape, in detail the space limited by points 111' (FIGS. 1A and 1B).

In order to obtain a proper operation of the gear shifting, said partial stroke of the tooth 17 or in other terms said depth p of the shallow recess 162, has to meet the above-mentioned condition of climbing over the ridge 112b of the selecting element in order to guarantee the subsequent engagement of the tooth 17 with the through-portion 161 by the effect of the relative rotation between the two coupling gears. Apart from what above, a good rule is that the partial rotation takes into consideration even the motion of the ratchet 111, by making the latter to complete its own reinforcing motion on the pins 113.

For example, if the depth of the shallow recess 162 results to be not sufficient, it happens that the drum performs a partial rotation, but the ratchet 111 is not capable to reach a position so as to encompass the pair of adjacent pins 113. In particular, it happens that a point of the ratchet 111 does not succeed in climbing over one of the pins 113, and then the subsequent action of the same results to be unsuccessful.

In a real dynamics, the gearbox determines pushes that, in case of partial coupling, succeed in bringing the gear back in the idle position.

In order to avoid this inconvenient, in addition to a suitable rotation of the drum in a pre-coupling phase, a second through-opening 161' is provided (FIGS. 1A and 1B) obtained on opposite side with respect to the first through-opening 161. The second through-opening allows the tooth 17 to be able to perform the coupling even in a phase for releasing the gas wherein a rotation in opposite direction between the two gears takes place.

Figure 1F:
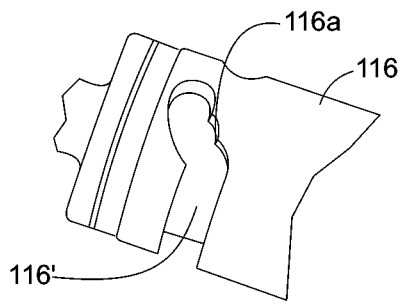
FIG. 1F is a partial perspective view of a track of the desmodromic drum.

Moreover, in a preferred embodiment, as shown in FIG. 1F, the track 116' of desmodromic drum 116 comprises a recess 116a, that is an indentation, so as to keep the fork 119 in a stable position in order to avoid a disengagement of the gear. Preferably the track 116' controls the passage between the neutral gear and the first gear. In this way, apart from what described above, this additional technical detail contributes to avoid that in the shifting dynamics the pre-engagement involves an inverse rotation of the selecting element 112 which would involve a disengagement of the gear. The recess 116a obtained on the track 116' of the desmodromic drum allows to create a kind of barrier to keep in position the fork 119 and thus to avoid the above-mentioned drawback.

The track 116' guiding the gearbox between neutral and first gear corresponds to a limited rotation, about 34°. In this case, then the push produced by the index 114, 115 118 results to be lower since the ridge of the selecting element 112 results to be lower. Therefore, the pre-engagement phase is more marked and the possibility of disengaging the gear is higher. The fact of implementing the recess 116a on the track of the desmodromic drum 116 solves such drawback.

In particular, in structural terms, the portion of shallow recess 162 has a thickness $S_2$ comprised between 1 mm and 6 mm, in particular between 3.0 mm and 4.0 mm. Preferably, the thickness $S_2$ is about half the thickness $S_1$.

Improved effects in terms of acoustics are obtained even upon engaging the gears, as it will be described in detail.

From the functional point of view, the double depth of the coupling slot 16 allows to obtain an engaging manoeuver substantially in two phases.

In a first phase the coupling tooth 17 performs a first fraction of its axial stroke (about 50%) and touches frontally the shallow recess 162 of the coupling slot 16.

After a related rotation, the coupling tooth 17 faces on the portion of through-slot 161 and, in this moment, it can perform a second fraction of its axial stroke, that is it can complete the remaining 50% of axial stroke, the engagement is completed.

This geometry of the coupling slot 16 has advantageous effects improving the acoustic comfort in the gear shift engagements, in addition to driving at low speeds with engaged gear, as described above.

In the phases of gear shifting, or engaging the first gear starting from neutral gear when the vehicle is still, it is obtained that the relative rotation between the idle wheel 6 and the coupling wheel 7—having respective angular speeds $\omega_1$ and $\omega_2$—results to be slower than a traditional engagement, thanks to the slowing-down effect of the friction between coupling tooth 17 and shallow recess 162, as it will be described hereinafter in details.

Figure 3A:
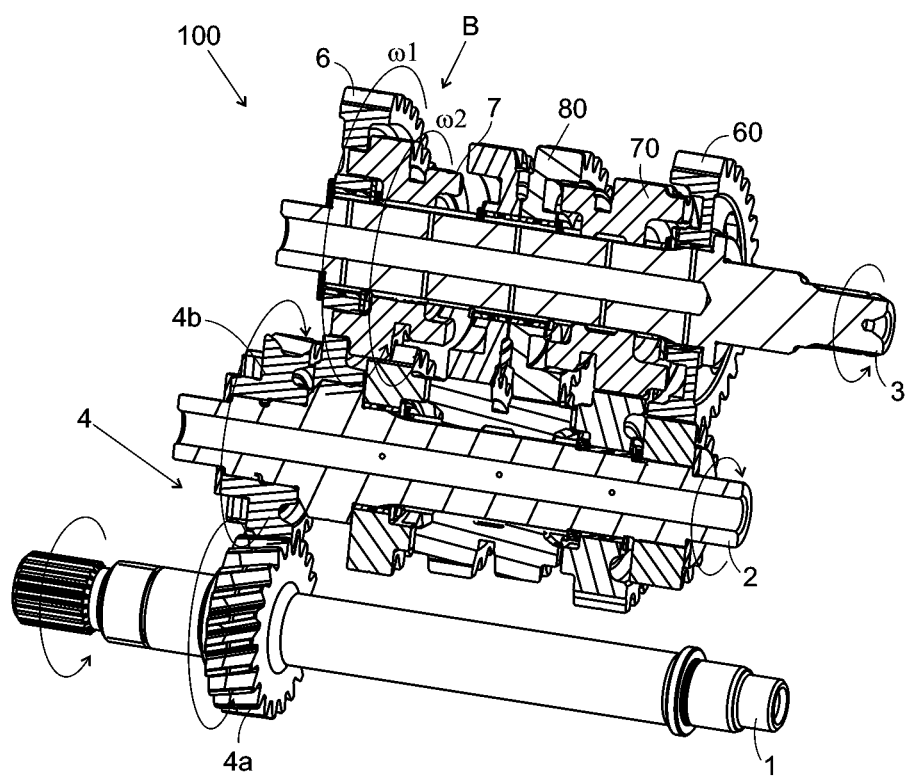
FIG. 3A is a cross sectional view of FIG. 3.
Figure 6:
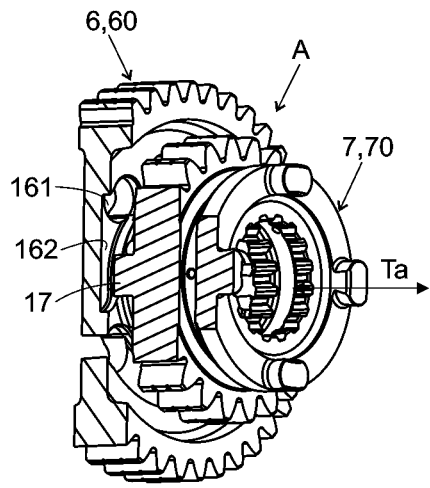
FIG. 6 is a cross sectional view showing the front engagement phases between the idle wheel of FIG. 4 and the coupling wheel of FIG. 5.
Figure 7:
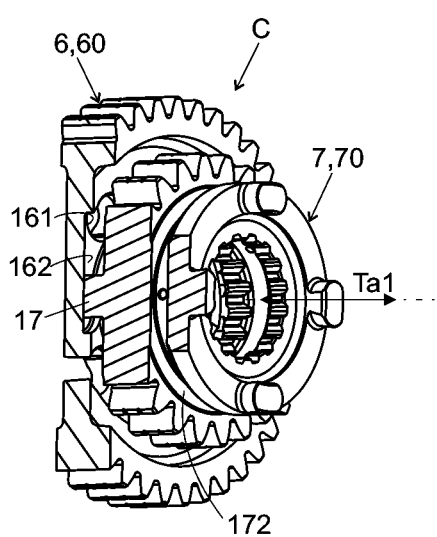
FIG. 7 is a cross sectional view showing the front engagement phases between the idle wheel of FIG. 4 and the coupling wheel of FIG. 5.
Figure 8:
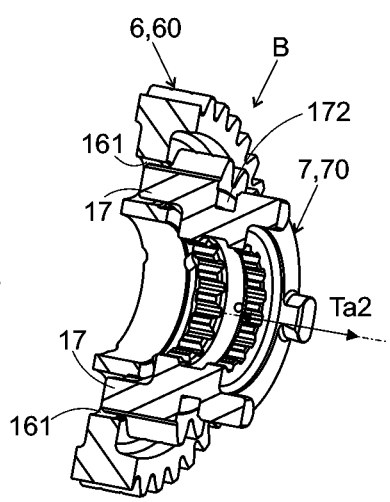
FIG. 8 is a cross sectional view showing the front engagement phases between the idle wheel of FIG. 4 and the coupling wheel of FIG. 5.

In particular, as shown in sequence in FIGS. 6 to 8, it happens that in the contact of the coupling tooth 17 with the portion of shallow recess 162 (FIG. 7) a friction is created between the face 172 of the coupling tooth 17 and the surface of the shallow recess 162. This sliding contact tends to slow down the angular speed $\omega_1$ of the idle wheel 6 (FIG. 3A). In this way, a synchronizing effect is implemented between the idle wheel 6 and the coupling wheel 7 which determines a reduction in difference of the angular speed therebetween $\omega_1 - \omega_2$. As the angular speed difference is reduced and consequently the contact speed between coupling tooth 17 and coupling slot 16 is reduced, a more silent engagement is obtained.

Hereinafter a particular example is described.

Let's assume that one wishes to engage the first gear, starting from a neutral position when the vehicle is still.

Structurally, the first gear is represented by the idle wheel 6, whereas the coupling wheel 7 represents the fifth gear, according to the embodiment shown in FIGS. 2 to 11.

When the coupling wheel 7 moves towards the idle wheel 6, starting from the free configuration A (FIG. 7), an intermediate passage is implemented which provides a pre-engagement of the tooth 16 with the portion of shallow recess 162. The latter substantially acts as guide of the coupling tooth 17, by guaranteeing, as important aspect, the gear engagement, as described in detail hereinafter.

The involved speeds then are the angular speed of the idle wheel $\omega_1$ and the angular speed $\omega_2$ of the coupling wheel 7, which, when the vehicle is still, as the secondary shaft is connected to the wheel 130, is null.

When the clutch group 120 is actuated, the angular speed $\omega_1$ when the clutch detaches in theory should result to be zero, but practically it has a value different from zero. Then there is a difference in the angular speed. This difference in angular speed can be found even in the gear shifting in general.

In the light of above, the intermediate phase C contacting the coupling tooth 17 with the portion of shallow recess 162 creates a sliding which tends to slow down the idle wheel 6, by reducing the speed $\omega_1$ thereof. The coupling tooth 17 then, when arrives in contact with the pushing wall of the slot, "hits" it with less energy, the engagement then results to be more silent. This technical cunning device reduces the so-called "hammering" for engaging the first gear.

As said above, the portion of shallow recess 162 has to guarantee the pre-engagement of the gear.

Figure 9:
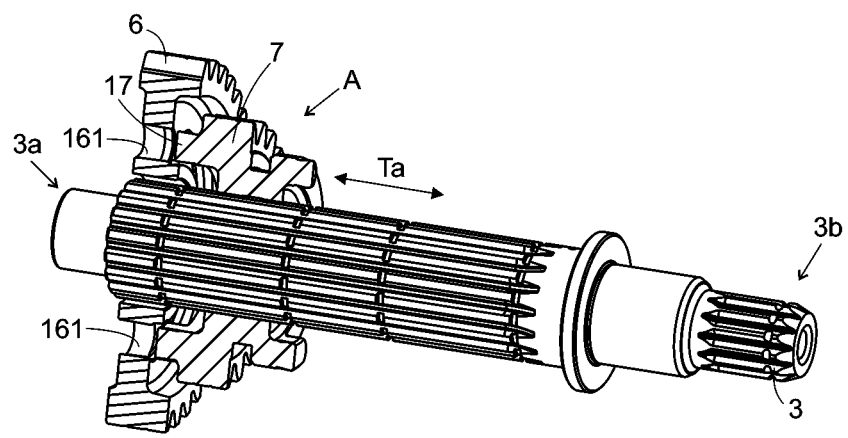
FIG. 9 is a simplified perspective view of the transmission gearbox of FIG. 2 wherein there are only the first and the coupling wheel assembled on a secondary shaft.
Figure 9A:
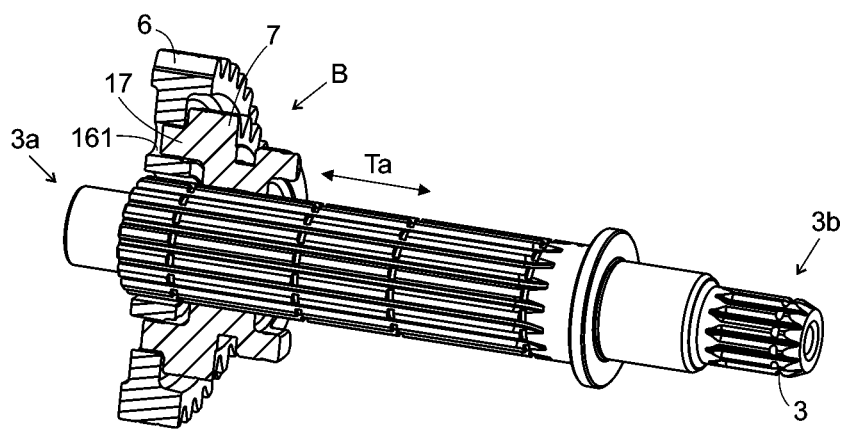
FIG. 9A is a simplified perspective view of the transmission gearbox of FIG. 2 wherein there are only the first and the coupling wheel assembled on a secondary shaft.

In other words, the user performing the gear engagement acts on the gearbox lever 110 by activating the clutch 120 (shown schematically in FIG. 2). From the mechanical point of view, then he/she moves the fork 119 which actuates the coupling wheel 7 in order to make it to perform the engaging axial stroke Ta (FIGS. 9 and 9A).

As the idle wheel 6 is shaped with coupling slot 16 having double depth, the engaging axial stroke is divided into a first fraction $Ta_1$ (FIG. 7) and in a second fraction $Ta_2$ of axial stroke (FIG. 8). The first fraction of axial stroke $Ta_1$ is the one which makes the user to understand that the gear engagement has taken place. In other words, the first stroke fraction is a gear engagement booking as the real engagement has not yet taken place (FIG. 7). The partial rotation Qp corresponds to the first fraction $Ta_1$ which rotation, preferably, is comprised between 22° and 26°, in particular comprised between 23° and 24°. The climbing over of the top 112b of the selecting element 112 by the bearing 115 of the stabilizer corresponds to the first fraction $Ta_1$.

The real engagement takes place upon completing the second fraction $Ta_2$ of axial stroke, once completed thereof the coupling tooth 17 wholly penetrates the portion of through-slot 161 (FIG. 8), thus defining the engaged configuration B.

Structurally, the first fraction of axial stroke $Ta_1$ guaranteeing the gear engagement by the user, is defined by the thickness $S_2$ of the portion of shallow recess 162.

In other words, with respect to what described above, the gear shifting takes place by means of the selecting element 112. At one end of the desmodromic drum 116 the selecting element 112 having a star-like shape is obtained. Such shape makes it to assume a function of cam 112 having a plurality of depressions, that is the valleys 112a, 112a' for example seven, one for each gear plus neutral gear. The selecting element is then divided into angular sectors. The angular spacing between the depressions of the angular sectors, that is the single gears, is 60°. There is an angular difference for the first angular sector, which identifies the neutral position having a value of 34°.

The depressions 112a, 112a' are used as seat for the roll bearing 115 placed at the end of a lever 114 fixed with its fulcrum, in this case, on the axis of the ratchet 111. The lever 111 is always kept in contact with the cam by means of a return spring 118 (FIG. 1B).

This cam-lever-bearing-spring group is also called a "jumping" or "index" system.

The index further has the function of locking the rotation of the desmo 116 when a determined gear is engaged.

The ratchet 111, which is put in rotation by the gearbox lever 110 and by the related countershafts, hooks one of the six small pins 113 inserted axially between the selecting element 112 and the desmodromic drum 116 and allows the desmodromic drum 116 itself to rotate slightly more than thirty degrees. This rotation corresponds to an axial shifting of the fork 119 so that the front teeth of the coupling wheel 7 rest upon the portions of shallow recess 162 of the slots of the idle wheel 6 (FIG. 1B'). At the same time, the bearing has ascended on the ramp as far as going beyond the top 112b of the cam (FIG. 1D).

At this point, there is a very short deadlock phase wherein the coupling wheel 7 rotates with respect to the idle wheel 6 until the coupling tooth 17 meets the portion of through-slot 161 (FIG. 8). In this way, by the effect of the push exerted by the index, the desmo 116 can complete its rotation, the fork 119 and the gear complete the axial shifting and the engagement is completed.

In order that everything works, it is essential that the first phase of kinematic mechanisms allows the bearing 115 to go beyond the top of the selecting element 112, otherwise, during deadlock, the index would make the desmo 116 to rotate backwards and the manoeuvre could be unsuccessful. It is also essential that the ratchet 111 completes its own reinforcement in order to allow the subsequent actuating action on the pins 113.

What above described, in structural terms, translates into a thickness $S_2$ of the portion of shallow recess so that the bearing performs a sufficient stroke so as to go beyond the top 112b of the selecting element 112.

In other structural aspects in detail, the transmission gearbox of a motor vehicle, as shown in FIG. 2, provides the clutch shaft 1. The motion transmission takes place by means of the primary transmission which provides a first gear 4a integral to the clutch shaft 1, and apt to engage with a second gear 4b arranged on the primary shaft 2. A third gear 51 engages with the idle wheel 6.

A group of gears is arranged on the primary shaft and on the secondary shaft with the purpose of varying the transmission ratio and performing the gear shifting.

Figure 5:
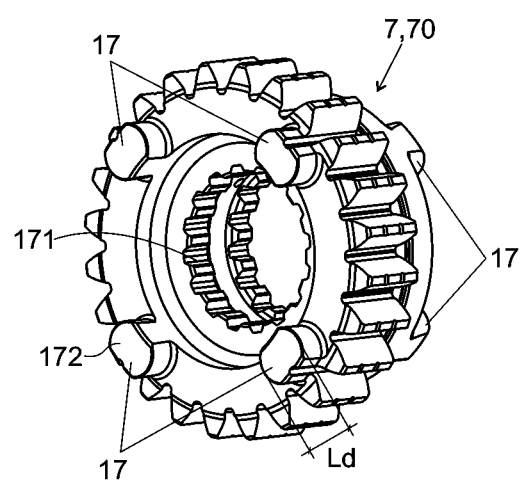
FIG. 5 is a perspective view of a coupling wheel of the transmission gearbox engaging frontally with the idle wheel of FIG. 4.

By referring to FIGS. 9 and 9A, the secondary shaft 3 is a grooved shaft whereon the coupling wheel 7, equipped with respective millerays teeth 171, is slidingly inserted (FIG. 5). The idle wheel 6 placed at one first end 3a is assembled instead on bearings 5 (FIG. 2). The second end 3b of the shaft 3 is arranged for the connection to a wheel 130 or another element to be moved.

Figure 10:
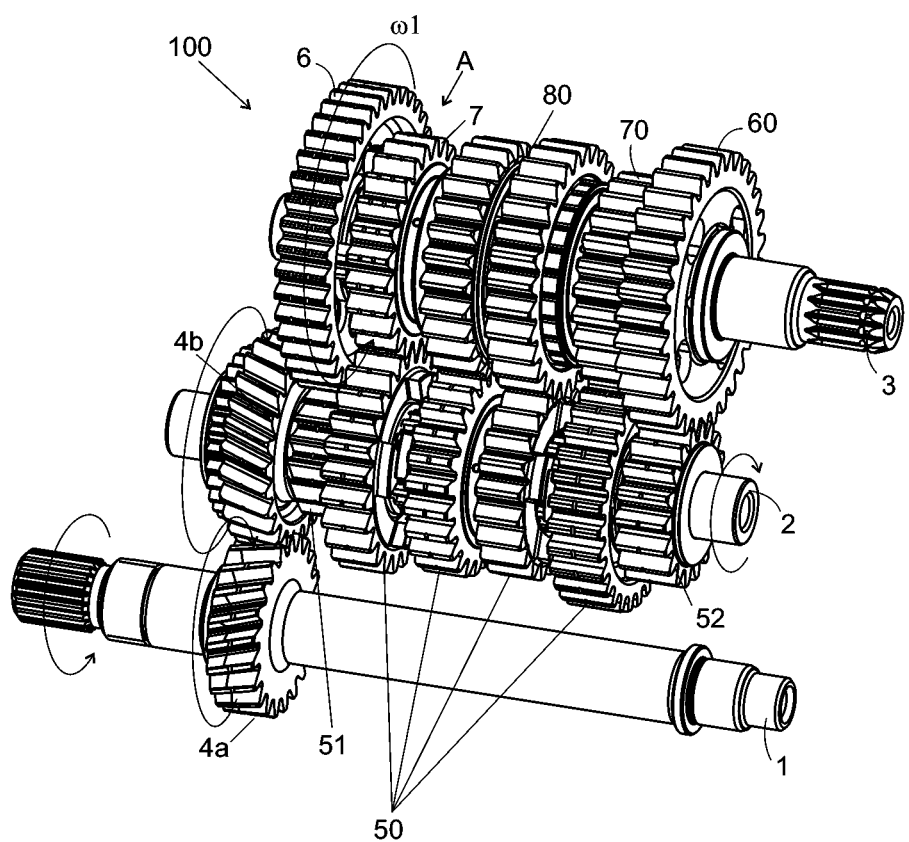
FIG. 10 is a perspective view of the complete transmission gearbox in the first configuration.
Figure 11:
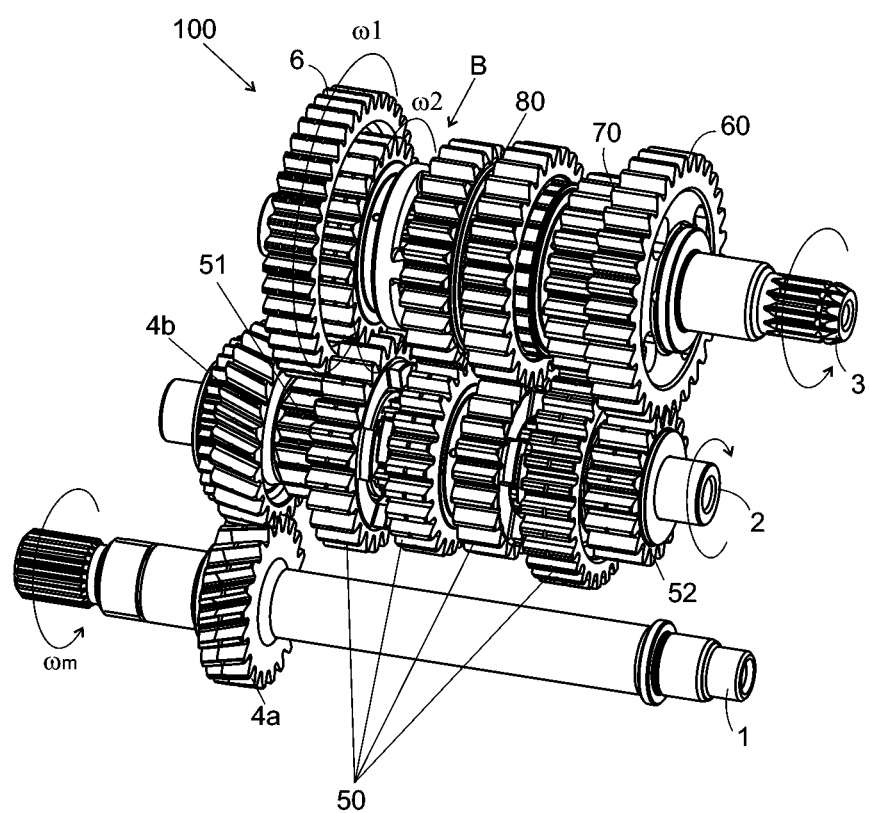
FIG. 11 is a perspective view of the complete transmission gearbox in the second configuration.

As shown in FIGS. 10 and 11, the transmission gearbox 100 in its complete version comprises a plurality of gears. The same coupling functionality and the same geometry of the idle wheel 6 is implemented even for the wheel 60 which obtains a front coupling with a third wheel 70, and for the fourth wheel 80 which has a double face, implementing the front coupling with the coupling wheel 7 and the third wheel 70, respectively.

According to a preferred embodiment the transmission gearbox 100 for a motor vehicle M comprises:
- a gearbox lever 110;
- a ratchet 111 actuated by means of said gearbox lever 110;
- a selecting element 112 actuated by said ratchet 111;
- a stabilizer 114,115 associated to said selecting element 112,
- wherein said selecting element 112 has a star-like shape and comprises a plurality of valleys 112a, 112a' spaced out by a plurality of ridges 112b, said valleys 112a, 112a' defining a corresponding gearbox gear;
- a primary shaft 2 apt to receive a driving torque M produced by actuation means 150, by means of a primary transmission 4a,4b;
- a secondary shaft 3 dragged by the primary shaft 2 by means of a toothed coupling formed between first wheels 51, 50, 52 of the primary shaft 2 and second wheels 6, 7, 80, 70, 60 of the secondary shaft 3, wherein said second wheels 6, 7, 80, 70, 60 of the secondary shaft 3 comprise:
- at least an idle wheel 6, 60, 80 comprising a number of coupling slots 16; wherein the idle wheel 6, 60, 80 is dragged by one of said first wheels 51, 52 of said primary shaft 2,
- at least a coupling wheel 7, 70 revolvingly integral to said secondary shaft 3 comprising at least a number of coupling teeth 17 apt to engage in corresponding coupling slots 16;

wherein the coupling wheel 7, 70 is arranged adjacent to the idle wheel 6, 60, 80 with the coupling teeth 17 faced towards the coupling slots 16, and it can be axially moved on the secondary shaft 3 when a rotation of said selecting element 112 is triggered, for translating between a free configuration A, wherein the coupling wheel 7, 70 is disengaged with respect to the idle wheel 6, and an engaged configuration B, wherein the coupling wheel 7, 70 is engaged with the idle wheel 6, 60, 80 by implementing a front coupling between the coupling teeth 17 and the coupling slots 16 for transmitting the motion between the primary shaft 2 and the secondary shaft 3, wherein said coupling slot 16 comprises a portion of shallow recess 162 extending for at least an angular sector Lc of said slot 16, so as to define at least a first through-portion 161 and a second closed portion 162, wherein the second closed portion 162 allows to intercept and guide the tooth coupling 17 towards the first through-portion 161 implementing a coupling with predetermined tolerance with the coupling tooth 17, by reducing noisiness both in the engaging phase and during operation wherein said portion of shallow recess 162 has a depth p so that:
- when said tooth rests on said shallow recess 162, said selecting element 112 performs a partial rotation Qp, said partial rotation Qp being so as to move said stabilizer 114,115 between a first position wherein it lies at a first valley 112a of the selecting element 112, and a second position wherein said stabilizer 114,115 climbs over the ridge 112b adjacent to said first valley 112a;

when said coupling tooth 17 engages with said through-portion 161,161' said stabilizer 114,115 lies in a second valley 112a' of the selecting element 112, adjacent to said first valley 112a.

The above description of embodiments of the invention is able to show the invention from the concept point of view so that other people, by using the known art, could modify and/or adapt in several applications such specific embodiments without additional searches and without leaving the inventive concept and, then, it is meant that such adaptations and/or modifications could be considered as equivalent of the specific embodiments. The means and materials for implementing the several described functions could have various nature without leaving the invention scope therefore. It is to be meant that the used expressions and terms have a purely descriptive, and thus not limiting, purpose.

While specific embodiments of the invention have been shown and described in detail to illustrate the application of the principles of the invention, it will be understood that the invention may be embodied otherwise without departing from such principles.

The invention claimed is:

1. A transmission gearbox for a motor vehicle, the transmission gearbox comprising:
    a gearbox lever;
    a ratchet actuated via said gearbox lever;
    a selecting element actuated by said ratchet, wherein said selecting element has a star-like shape and said selecting element comprises a plurality of valleys spaced out by a plurality of ridges, said valleys defining a corresponding gearbox gear;
    a stabilizer associated with said selecting element;
    a primary shaft configured to receive a driving torque;
    a secondary shaft dragged by said primary shaft via a toothed coupling formed between first wheels of said primary shaft and second wheels of said secondary shaft, wherein said second wheels of said secondary shaft comprise at least an idle wheel comprising a number of coupling slots and at least a coupling wheel comprising at least a number of coupling teeth configured to engage in corresponding coupling slots, wherein said coupling wheel is configured to move axially on said secondary shaft when a rotation of said selecting element is triggered, for translating between a free configuration, wherein said coupling wheel is disengaged with respect to said idle wheel, and an engaged configuration wherein said coupling wheel is engaged with said idle wheel by implementing a front coupling for transmitting a motion between said primary shaft and said secondary shaft, wherein said coupling slot comprises a portion of a shallow recess and at least a first through-portion, wherein said portion of said shallow recess has a depth so that:
    when said coupling tooth rests on said shallow recess, said selecting element performs a partial rotation such that said partial rotation moves said stabilizer between a first position wherein said stabilizer lies at a first valley of said selecting element, and a second position wherein said stabilizer climbs over one of said ridges adjacent to said first valley;
    when said coupling tooth engages with said through-portion said stabilizer lies in a second valley of said selecting element, adjacent to said first valley.

2. The transmission gearbox according to claim 1, wherein said selecting element is associated to a desmodromic drum, said desmodromic drum comprising at least a track controlling an axial shifting of a fork associated with said coupling wheel.

3. The transmission gearbox according to claim 2, wherein said track controlling a passage between said idle gear and said first gear comprises a recess configured to keep in position said fork by avoiding a disengagement of said gear.

4. The transmission gearbox according to claim 1, wherein said partial rotation is comprised between 22° and 26°.

5. The transmission gearbox according to claim 1, wherein said selecting element defines respective angular sectors for said gear shifting, wherein an angular spacing between said valleys of said angular sectors is 60°, and wherein for a first angular sector identifying a position of an idle gear, said angular spacing has a value of 34°.

6. The transmission gearbox according to claim 1, wherein said first through-portion has an angular size slot defined as an angular sector and said coupling tooth has a longitudinal size tooth, reduced with respect to said angular size slot so as to form a coupling with backlash with said coupling tooth with a coupling tolerance comprised between 0.1 mm and 1.5 mm.

7. The transmission gearbox according to claim 1, wherein said first through-portion of the coupling slot is defined by at least an annular portion thickness of an annular portion of the idle wheel and said shallow recess is closed by a bottom wall having a bottom wall thickness, said bottom wall thickness being less than said annular portion thickness, said depth of said shallow recess being equal to a difference between said annular portion thickness and said bottom wall thickness.

8. The transmission gearbox according to claim 1, wherein said portion of shallow recess has a thickness comprised between 1.0 mm and 6.0 mm.

9. The transmission gearbox according to claim 7, wherein said bottom wall thickness is about half said annular portion thickness.

10. The transmission gearbox according to claim 1, wherein said portion of shallow recess extends for an angular sector of about two-thirds of said slot.

11. The transmission gearbox according to claim 1, wherein said coupling slot extends from a first end to a second end, said first through-portion being arranged at said first end of said coupling slot and said second through-portion being arranged at said second end of said coupling slot.

12. A saddled vehicle with two or more wheels comprising a transmission gearbox, the transmission comprising:
    a gearbox lever;
    a ratchet actuated via said gearbox lever;
    a selecting element actuated by said ratchet, wherein said selecting element has a star-like shape and said selecting element comprises a plurality of valleys spaced out by a plurality of ridges, said valleys defining a corresponding gearbox gear;
    a stabilizer associated with said selecting element;
    a primary shaft configured to receive a driving torque;
    a secondary shaft dragged by said primary shaft via a toothed coupling formed between first wheels of said primary shaft and second wheels of said secondary shaft, wherein said second wheels of said secondary shaft comprise at least an idle wheel comprising a number of coupling slots and at least a coupling wheel comprising at least a number of coupling teeth configured to engage in said corresponding coupling slots, wherein said coupling wheel is configured to move axially on said secondary shaft when a rotation of said selecting element is triggered, for translating between a free configuration, wherein said coupling wheel is disengaged with respect to said idle wheel, and an engaged configuration wherein said coupling wheel is engaged with idle wheel by implementing a front coupling for transmitting a motion between said primary shaft and said secondary shaft, wherein said coupling slot comprises a portion of a shallow recess and at least a first through-portion, wherein said portion of said shallow recess has a depth so that:

when said coupling tooth rests on said shallow recess, said selecting element performs a partial rotation such that said partial rotation moves said stabilize between a first position wherein said stabilizer lies at a first valley of said selecting element, and a second position wherein said stabilizer climbs over one of said ridges adjacent to said first valley;

when said coupling tooth engages with said through-portion said stabilizer lies in a second valley of said selecting element, adjacent to said first valley.

13. A transmission wheel of a transmission gearbox, the transmission gearbox comprising:
a gearbox lever;
a ratchet actuated via said gearbox lever;
a selecting element actuated by said ratchet, wherein said selecting element has a star-like shape and said selecting element comprises a plurality of valleys spaced out by a plurality of ridges, said valleys defining a corresponding gearbox gear;
a stabilizer associated with said selecting element;
a primary shaft configured to receive a driving torque;
a secondary shaft dragged by said primary shaft via a toothed coupling formed between first wheels of said primary shaft and second wheels of said secondary shaft, wherein said second wheels of said secondary shaft comprise at least an idle wheel comprising a number of coupling slots and at least a coupling wheel comprising at least a number of coupling teeth configured to engage in said corresponding coupling slots, wherein said coupling wheel is configured to move axially on said secondary shaft when a rotation of said selecting element is triggered, for translating between a free configuration, wherein said coupling wheel is disengaged with respect to said idle wheel, and an engaged configuration wherein said coupling wheel is engaged with idle wheel by implementing a front coupling for transmitting a motion between said primary shaft and said secondary shaft, wherein said coupling slot comprises a portion of a shallow recess and at least a first through-portion, wherein said portion of said shallow recess has a depth so that:

when said coupling tooth rests on said shallow recess, said selecting element performs a partial rotation such that said partial rotation moves said stabilize between a first position wherein said stabilizer lies at a first valley of said selecting element, and a second position wherein said stabilizer climbs over one of said ridges adjacent to said first valley;

when said coupling tooth engages with said through-portion said stabilizer lies in a second valley of said selecting element, adjacent to said first valley.

14. The transmission gearbox according to claim 1, wherein said partial rotation is comprised between 23° and 24°.

15. The transmission gearbox according to claim 1, wherein said first through-portion has an angular size slot defined as an angular sector and said coupling tooth has a longitudinal size tooth, reduced with respect to said angular size slot so as to form a coupling with backlash with said coupling tooth with a coupling tolerance comprised between 0.3 mm and 0.6 mm.

16. The transmission gearbox according to claim 1, wherein said portion of shallow recess has a thickness comprised between 3 mm and 4 mm.

* * * * *